United States Patent [19]

Bohn et al.

[11] Patent Number: 4,741,215
[45] Date of Patent: May 3, 1988

[54] FLOW TUBE FOR A MAGNETIC FLOWMETER

[75] Inventors: David C. Bohn, Eden Prairie; Lloyd E. Graupmann, Plato, both of Minn.

[73] Assignee: Rosemount Inc., Eden Prairie, Minn.

[21] Appl. No.: 39,821

[22] Filed: Apr. 15, 1987

Related U.S. Application Data

[63] Continuation of Ser. No. 751,784, Jul. 3, 1985, abandoned.

[51] Int. Cl.[4] .................................................. G01F 1/58
[52] U.S. Cl. ........................................................ 73/861.12
[58] Field of Search ............ 73/861.12, 861.16, 861.17; 310/11

[56] References Cited

U.S. PATENT DOCUMENTS

| | | | |
|---|---|---|---|
| 3,194,068 | 7/1965 | Mannherz et al. | 73/194 |
| 3,324,543 | 6/1967 | McVey et al. | 29/472 |
| 3,750,468 | 8/1973 | Grauer | 73/194 |
| 4,128,776 | 12/1978 | Boquist et al. | 310/11 |
| 4,181,013 | 1/1980 | Wada | 73/194 |
| 4,253,340 | 3/1981 | Schmoock | 73/861.12 |
| 4,262,542 | 4/1981 | Freund, Jr. et al. | 73/861 |
| 4,262,543 | 4/1981 | Grebe, Jr. et al. | 73/861 |
| 4,269,071 | 5/1981 | Wada | 73/861 |
| 4,279,166 | 7/1981 | Gryn et al. | 73/861 |
| 4,290,312 | 9/1981 | Kobayashi | 73/861 |
| 4,325,261 | 4/1982 | Freund, Jr. et al. | 73/861 |
| 4,388,834 | 6/1983 | Schmoock | 73/861 |
| 4,409,846 | 10/1983 | Veno | 73/861.17 |
| 4,419,899 | 12/1983 | Wada | 73/861 |
| 4,428,241 | 1/1984 | Davis et al. | 73/861.12 |
| 4,442,375 | 4/1984 | Nishio et al. | 313/142 |
| 4,454,766 | 6/1984 | Reinhold et al. | 73/861.12 |
| 4,459,857 | 7/1984 | Murray et al. | 73/861 |
| 4,499,754 | 2/1985 | Akano et al. | 73/861 |
| 4,507,975 | 4/1985 | Bittner et al. | 73/861 |
| 4,513,624 | 4/1985 | McHale | 73/861.12 |
| 4,604,905 | 8/1986 | Dubbick | 73/861.11 |

FOREIGN PATENT DOCUMENTS

| | | | |
|---|---|---|---|
| 0113928 | 7/1984 | European Pat. Off. | 73/861.12 |
| 0125065 | 11/1978 | Japan | 73/861.12 |
| 56-130115 | 10/1981 | Japan | |
| 56-16423 | 12/1981 | Japan | |
| 83/02000 | 6/1983 | PCT Int'l Appl. | |
| 2068122 | 8/1981 | United Kingdom | 73/861.12 |

OTHER PUBLICATIONS

Ceramics in Severe Environments, (W. Wurth Kriegel and H. Palmour III, Eds.) Plenum Publ., N.Y., 1971, pp. 503–520.

Primary Examiner—Herbert Goldstein
Attorney, Agent, or Firm—Kinney & Lange

[57] ABSTRACT

A flow tube of a ceramic material used for a magnetic flowmeter is formed to have regions of a ceramic material which has enhanced properties useful in magnetic flowmeters, such as enhanced electrical conductivity or enhanced magnetic permeability. The ceramic material having enhanced electrical conductivity is used to form sensing surfaces directly in the flow tube wall so that there is no need to have separate metal electrodes attached to or otherwise formed in the wall of the flow tube. This insures a strong, monolithic flow tube wall.

29 Claims, 3 Drawing Sheets

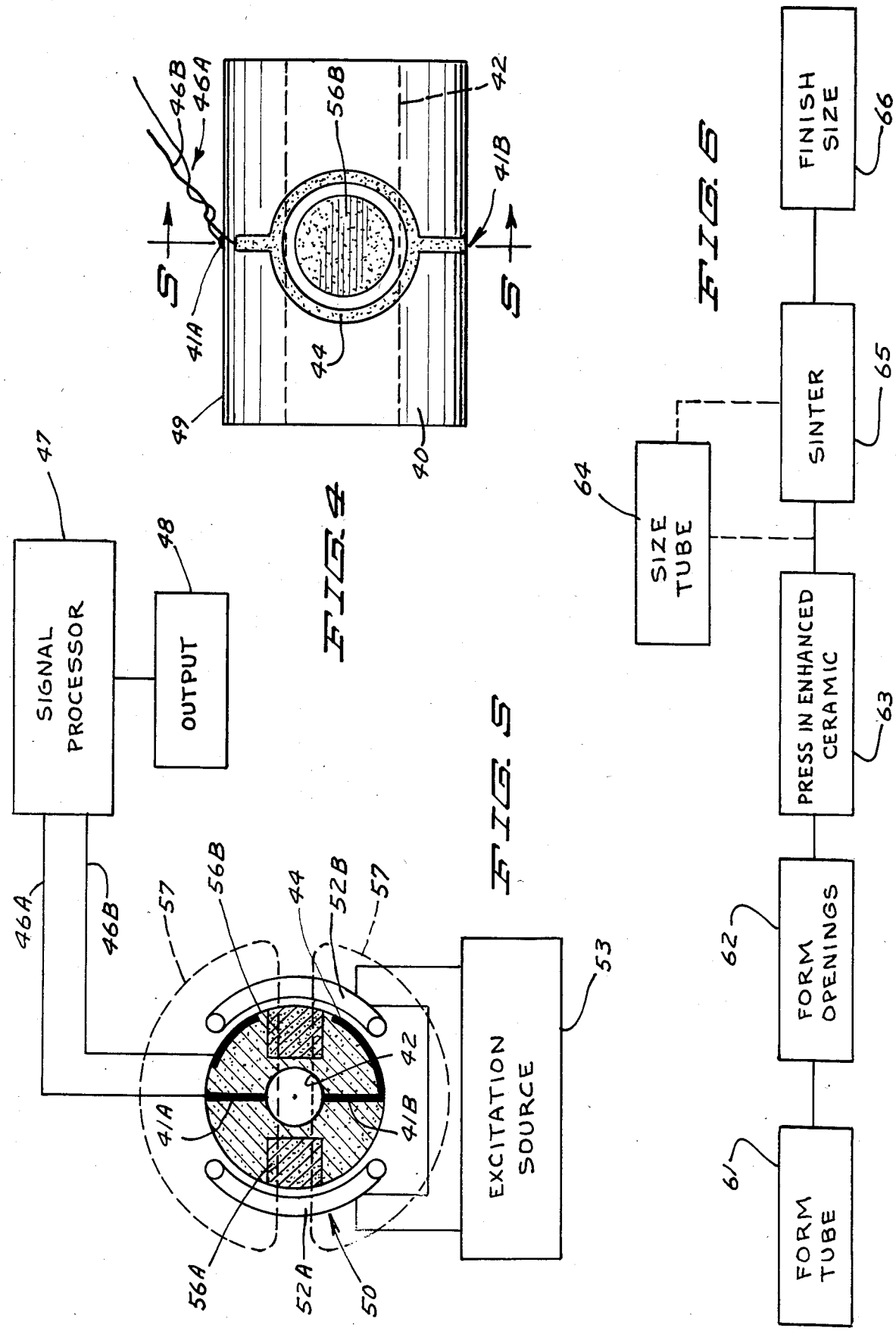

FLOW TUBE FOR A MAGNETIC FLOWMETER

CROSS REFERENCE TO RELATED APPLICATION

This application is a continuation of copending application Ser. No. 06/751,784, filed July 3, 1985 for FLOW TUBE FOR A MAGNETIC FLOWMETER, now abandoned.

BACKGROUND OF THE INVENTION

1. Field of the Invention

The present invention relates to ceramic flow tubes for use in magnetic flowmeters including regions of different ceramic composition to provide enhanced properties to form fluid contacts or magnetic pole pieces for the flowmeter.

2. Description of the Prior Art

U.S. Pat. No. 3,750,468 shows a flowmeter that has a ceramic liner.

Similarly, U.S. Pat. No. 4,507,975 shows a sensor for a magnetic flowmeter having an oxide ceramic measuring tube, with the measuring electrodes comprising metal inserts that are sintered into the ceramic tube during the time that the tube is being sintered. This forms a composite structure (metal-ceramic) with its inherent problems of bonding, weak zones, and possible cracks under highly pressurized fluids. The electrodes form stress concentrators, as well as areas of reduced corrosion and abrasion resistance. Also, the electrodes form protruding surfaces, which tend to reduce performance because of suspended particles hitting such electrodes. Sealing is also difficult, as the coefficients of thermal expansion of the ceramic and electrode materials are generally different.

Bonding of two different ceramic materials together to obtain special properties is disclosed in both U.S. Pat. Nos. 3,324,543 and 4,442,375. These patents also discuss the problems involved in obtaining metal to ceramic seals.

U.S. Pat. No. 4,388,834 shows an electromagnetic flowmeter that has a pair of electrodes of electrically-conductive synthetic plastic material fused in the liner.

U.S. Pat. No. 4,499,754, issued Feb. 9, 1985 shows an electromagnetic flowmeter that uses an insulating liner for lining the measuring pipe, with conductive powder forming conductive paths in an insulating material.

SUMMARY OF THE INVENTION

The present invention relates to ceramic flow tubes which have regions of ceramic material different from the ceramic material of the majority of the flow tube, which regions are enhanced in electrical conductivity and/or magnetic permeability, and sintered into place to form a monolithic structure. The terms monolith and monolithic as used herein refer to a flow tube that is formed as a single component that is a sintered whole and free of any seals to metal parts such as electrodes. The monolithic structure eliminates the solid metal electrodes and minimizes stress concentrations, protrusions into the flow stream, and regions of degradation of corrosion and abrasion resistance. A protruding electrode also forms a crevice where it joins the flow tube; this crevice is a place where material can accumulate and promote the growth of undesired bacteria in food handling applications. The monolithic structure eliminates the need to mount metal electrodes on the flow tube and the need to form seals between the ceramic flow tube and the shanks of the electrodes.

The ceramic tube is formed and then openings are provided in desired locations. The openings are filled with the enhanced property ceramic material and the flow tube is then sintered and finished. Suitable electrical contacts are applied to the exterior surfaces of the enhanced regions forming fluid contacts. The region of enhanced conductivity conducts the signal from the interior surface of the flow tube to the exterior surface of the flow tube so that the flow tube can function as a flowmeter. Magnetic fields are formed in a region of the fluid flowing through the flowmeter, to produce a flow-induced EMF to provide a measure of flow.

The method of constructing such a flow tube also forms a part of the invention in that the steps of formation provide for a strong, reliable flow tube, that is, it is pressure bearing and does not require an external support to contain pressure in the flow line.

Using the monolithic structure produced as disclosed herein, the designer is able to shape the electrical lead and contact areas to reduce external noise pick-up, and provide better noise attenuation, particularly when used with low conductivity fluids. Multiple conductive locations in the flow tube can be achieved easier than with conventional, mechanically attached electrodes, and in addition the surface finish of the tube can be very smooth without any crevices or obstructions, and thus no sources of cavitation in the fluid flow. The geometric configuration of the surface of the enhanced conductivity area which contacts the fluid can be made to accommodate various fluid impurities, sludges, or other foreign materials that have special needs.

Various materials can be used for the enhanced regions, including metal powders or ferrites mixed into ceramic materials to enhance the conductivity or magnetic permeability in the regions desired.

BRIEF DESCRIPTION OF THE DRAWINGS

FIG. 4 is a side view of a modified form of the invention showing an electrically conductive path formed on the tube surface that carries the electrical signals to the same side of the flow tube;

FIG. 5 is a part schematic, part sectional view taken generally along line 5—5 in FIG. 4 and illustrating the means for providing a magnetic circuit through the flow tube.

FIG. 6 is a flow diagram representing a method of constructing a flow tube according to the present invention.

DETAILED DESCRIPTION OF THE PREFERRED EMBODIMENTS

Figure 1:
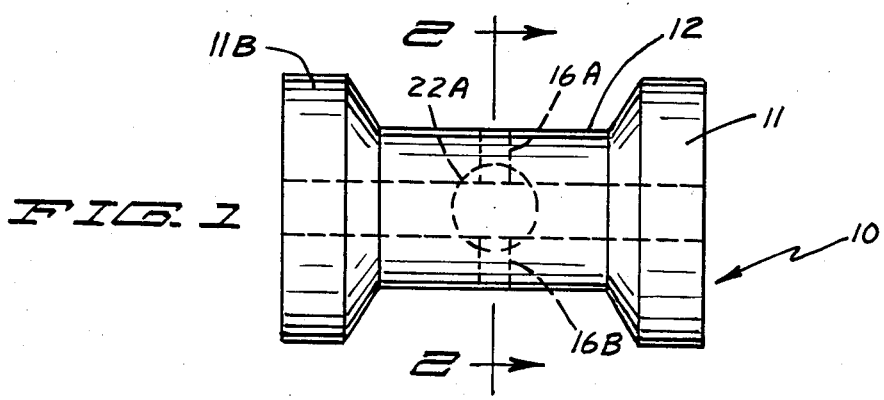
FIG. 1 is a side elevational view of a typical ceramic flow tube made according to the present invention.

As shown in FIG. 1, a ceramic flow tube illustrated generally at 10 has connecting flanges 11A,11B at its opposite ends, and a central flow tube section 12. A through bore (interior surface) indicated at 13 (see FIG. 2) carries the fluid, and the flanges 11A,11B permit the connection of the flow tube into a flow pipe. The connections can be made in any desired manner.

As shown, the tube 10 is made of a ceramic material selected for obtaining the necessary properties and capable of being formed in conventional processes. The ceramic material typically will be alumina ($Al_2O_3$) which is substantially neither electrically conductive nor highly magnetically permeable. The particle size is chosen to provide strength, abrasion resistance, and other desired properties. Typically two microns or smaller size particles are desired, and this will tend to optimize strength and density of the finished part. High purity alumina particles in the range of 99.5% pure alumina, are used. Fiber-reinforced ceramic may also be used for improved strength. Other substantially chemically inert, non-conductive, low permeability, pressure bearing materials may also be used.

Preferably the flow tube is formed by placing the powder, which has been premixed with suitable binders and lubricant so that it is free-flowing, into a die that comprises an outer casing and an inner member to form the bore, and applying pressure to achieve compaction such as by isostatic pressure. Isostatic pressure is a common way of forming ceramic materials in that it applies pressure equally to the powder on all sides to reduce the problems of nonuniformity due to die wall and powder friction.

A metal mandrel is generally used to form the nominal inside diameter of the flowmeter tube, and a pressurized rubber mold forms the outside diameter of the tube. The rubber thus carries the fluid pressure to force the ceramic particles against the central mndrel.

The compacted powder part, after the isostatic pressing, is strong enough to be removal from the mandrel and the rubber mold, if handled carefully.

This is a "green state" which is defined as a ceramic part prior to final densification. The material is relatively fragile and consists of compacted, loosely bonded powder.

The green part can be machined using conventional lathe and cutting tools, if carefully controlled to avoid overstressing the green ceramic material, and also to avoid producing chips, cracks, breakage or porous surfaces. Grinding of the surfaces can be completed, to resemble a spool as shown at 10 in FIG. 1, and actually it will be sized about 20% larger than the desired final part dimensions. The green part shrinks approximately 20% during final firing and densification.

A "bisque" firing is performed, preferably, to stiffen the structure slightly and provide an outer harder layer. After this bisque firing, the part can be handled and worked on without having as much likelihood of damage, but yet can be machined.

Holes which are outlined by lines at 16A, and 16B in FIG. 1 are then drilled. The holes are of sufficient size to provide for filling with a ceramic conductive material forming electrically conductive regions 17A and 17B (enhanced property regions) shown in FIG. 2.

In order to form these electrically conductive regions, a suitable conductive ceramic composite is made by mixing the alumina raw material previously used with a conductive metal powder, such that the metal powder is preferably 40-60% by weight of the metal ceramic composite. Additional waxes, gelatins, or other suitable binders are also added to allow the conductive composite to be thoroughly and uniformly mixed so that it can be kneaded and shaped into a ball or plug and then pushed into the drilled hole in the green state magnetic flowmeter liner.

Figure 2:
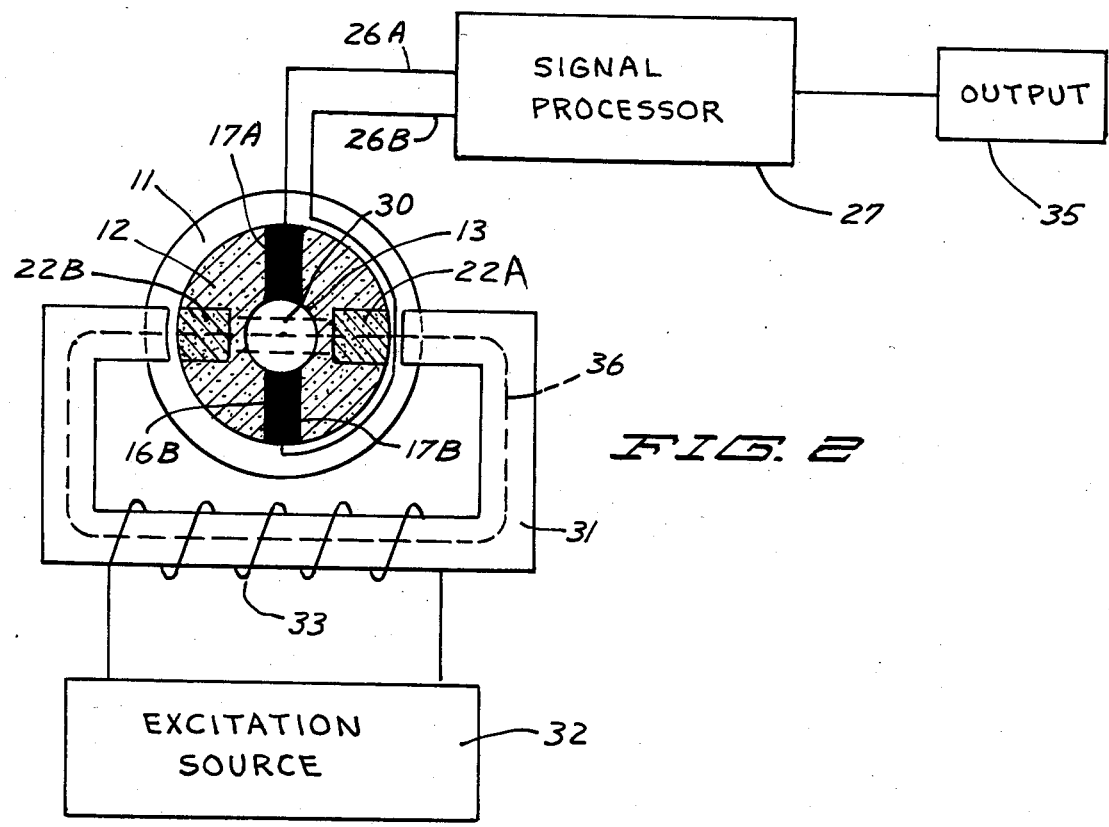
FIG. 2 is a part schematic, part sectional view taken as on line 2—2 in FIG. 1.

The regions of enhanced electrical conductivity 17A and 17B are shown to be cylindrical in FIG. 2. The region of enhanced electrical conductivity can take a more complicated shape, however, within the scope of this invention. The shape of the interior surfaces of the regions 17A and 17B can be made large and generally rectangular in shape to provide a larger surface area and better contact with the fluid in the bore. This provides improved performance with low conductivity fluids. The electrical resistance of the enhanced region can also be varied to provide improved properties. The resistivity can be raised by increasing the percentage of alumina and reducing the percentage of metal powder. The higher resistance of such an enhanced area (compared with a metal electrode) provides a benefit under fault conditions. If a large voltage is applied to the external circuit leads 26A and 26B, the resistance of the enhanced conductivity area limits the current that can flow inside the flow tube bore in response to the large voltage and thereby reduces the possibility of a spark igniting a flamable mixture in the bore of the flow tube. The percentages of powders can also be varied in the region to provide a gradual transition from conducting to non-conducting to further reduce stress concentration.

Additional bores indicated at 22A and 22B may be provided on the side surfaces of the flow tube section 12, centered on the same plane as that defined by the axes of the drilled holes 16A and 16B but having axes 90° from the holes 16A and 16B. The bores 22A and 22B generally will not extend to the central passageway 13, but will be formed as pockets, and then filled with a suitable ceramic material that has enhanced magnetic permeability over the aluminum oxide. These will form magnetic pole regions 22A and 22B generally perpendicular to the holes 16A and 16B. The material in bores 22A and 22B is also enhanced property ceramic material within the definition for purposes of this specification. The pole regions 22A and 22B also preferably include additional powders of conductive material so that the pole regions are conductive and serve as electrostatic shields to the fluid.

Once the enhanced material sections are filled with suitable unsintered ceramic metal composites, a central center bore mandrel is placed in the green liner with the enhanced property ceramic materials in place in the respective bores or drilled holes. The part will again be isostatically pressurized in a rubber mold for compaction of the enhanced material sections. This will force the composite enhanced property material into the holes and the counterbores to achieve a compaction density of this enhanced material which is similar to the rest of the flow tube. While one method has been described here for fabricating a green tube with enhanced regions, such a tube can be fabricated using other methods within the scope of the invention. For example, the enhanced regions can be isostaticly compacted in separate dies and then used as inserts in the tube as the tube is compacted into the green state.

The metal used for the enhanced property ceramic composite must meet the corrosion criteria required, melt at a temperature greater than the sintering temperature of the ceramic material (approximately 1200°–1600° C.) and also the enhanced property material must be compatible to air or to other special atmosphere used in the sintering process. Platinum is one of the metal powders that can be used in air atmosphere sintering of alumina ceramic to enhance electrical conductivity. The regions of enhanced magnetic properties may include ferrites mixed with alumina. Magnetically soft ferrite powders are sinterable to produce regions of enhanced permeability. Likewise, the enhanced property ceramic materials for both the magnetic regions 22A and 22B and the conductive regions 17A and 17B have particle sizes close to the size used for the alumina. The compaction of the enhanced property material portions will bring them substantially to the size of the green part tub.

After this compaction, the green part is lightly ground to remove any rough edges created in the second pressing operation of the enhanced. property material portions and it is then sintered in a furnace kiln in a conventional manner to remove the pores between the particles, and bond the particles tightly together. The sintering temperature and time is proportional to the inverse of the particle size. Careful control is maintained in using conventional techniques.

After sintering, the part is cooled and then ground to its final size with a smooth surface. The enhanced property ceramic material regions or portions, which can be enhanced from magnetic permeability standpoint or from electrical conductivity standpoint, are essentially monolithic and integrated into the rest of the flow tube and there are no seams, unjoined interfaces, cracks, or other imperfections on the interior surface of the bore or through the walls of the tube. The enhanced property material particles become an integral part of the ceramic material during sintering to substantially eliminate fault lines and imperfections.

Figure 3:
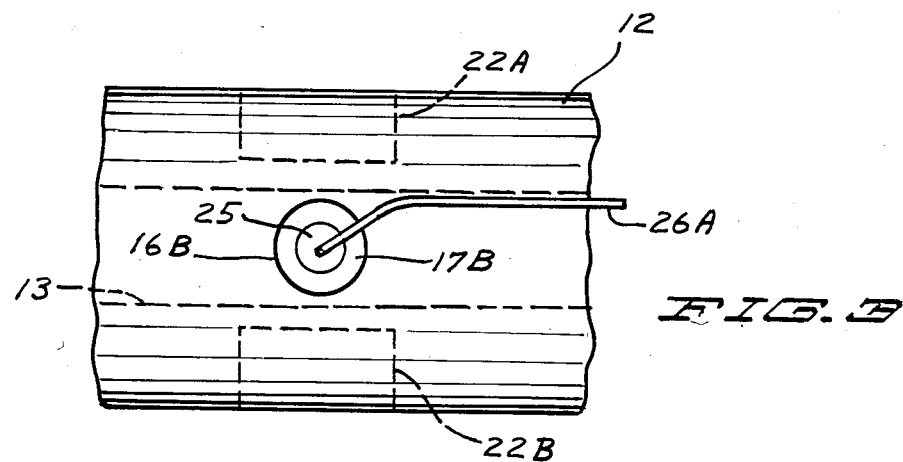
FIG. 3 is an enlarged fragmentary portion of a side of the flow tube showing an enhanced electrically conductive region, with a contact for carrying electrical signals on the surface thereof and enhanced magnetic permeability portions forming pole pieces.

FIG. 3 illustrates a contact 25 having a lead wire 26A that is used for connection to signal processing circuitry. The contact 25 can be metalized onto the exterior surface of the enhanced electrical conductive property ceramic material 17B, and then connected into suitable circuitry as desired.

As shown in FIG. 2, an operation means for producing a magnetic field 30 in the through bore is provided. This includes an armature 31, and an excitation source 32 that drives a coil 33 with a suitable excitation signal. The signal may be a pulse D.C., polar D.C., an alternating current or other type of coil excitation, to provide a magnetic field between the enhanced property material magnetic regions 22A and 22B, which are perpendicular to the axes of the enhanced property electrically conductive regions 17A and 17B. The regions 17A and 17B as shown are connected with the lead wires 26A and 26B to a signal processing circuit 27 of conventional design that senses the signals generated in the fluid by the Faraday Law interaction between the magnetic field 30 and the fluid flow in bore 13. An output circuitry 35 is connected to the output of the signal processor and is calibrated to represent flow. In FIG. 2, a single coil 33 is wound on armature 31. The magnetic field generating apparatus can also be constructed with a pair of coils wired in series, the coils being located near the ends of the armature at the flow tube. The regions 22A and 22B of enhanced permeability improve the performance of the magnetic field generation. They serve to reduce the net air gap in the magnetic circuit and thereby reduce the number of ampere-turns needed to achieve a desired field strength in the flow tube bore.

In FIGS. 4 and 5, a modified form of the invention is shown, and a tube 40 has regions 41A,41B formed in the wall thereof of enhanced conductivity materials. The regions 41A,41B extend from the exterior surface 49 to the interior surface 42 of a flow passageway which is provided in the flow tube 40. The region 41B is connected through an enhanced property, electrically conductive ceramic material lead indicated at 44 that extends in a path partially around the periphery of the flow tube 40 and provides an electrically conductive path for connection to lead wire 46B that leads to a signal processor 47 similar to that shown at 27. An output circuitry 48 is connected to the output of the signal processor and is calibrated to represent flow.

Lead 44 is formed by making a recess of desired size in the surface of the tube 40, and then filled the recess with enhanced property ceramic material (electrically conductive) prior to the second sizing and sintering. The lead 44 is formed at the time of forming fluid contacts and magnetic poles. The routing of lead 44 as well as leads 46A and 46B must be controlled so that there is a minimum amount of coupling between the magnetic field produced and the leads 44, 46A and 46B. This is done by symmetrically arranging the leads near the region 56B in such a fashion as to minimize the induced pickup by the electrode leads.

Additionally, means for generating a magnetic flux indicated at 50 are provided, and include coils 52A and 52B, which are energized through an excitation source 53 of conventional design.

The flow tube 40 also has enhanced poles or regions for enhanced magnetic permeability in the ceramic flow tube, and such poles or regions are shown at 56A,56B in FIG. 5. A signal processor 47 would also be connected to or include an output circuit 48, such as digital display, recorder or the like.

In both forms of the invention, it is illustrated that the enhanced property ceramic materials can either be electrically conductive, or have enhanced magnetic properties. The enhanced conductive and magnetic property ceramic materials each transfer an electromagnetic signal through the wall of the flow tube. The enhanced conductive ceramic transfers the flow-induced electromotive force from the fluid to the exterior surface of the tube wall. The enhanced magnetic ceramic transfers magnetic flux from the exterior field producing means to the fluid in the tube, thereby increasing or concentrating flux levels in the fluid over the levels that would otherwise be achieved without the magnetic ceramic. The flow tube wall near these regions of transfer is a ceramic monolith and seals are thus avoided. The enhanced property material can be formed into desired paths, such as on the exterior of the flow tube, merely by defining a path (or hole) and then filling it with the enhanced material and pressing it in place prior to sintering. Also, different types of magnetic circuits can be employed with the magnetic flowmeter within the state of the art.

Representative magnetic flux paths are represented by the dashed lines 36 in FIG. 2, and 57 in FIG. 5.

FIG. 6 shows a schematic representation of a typical method of forming the flow tube including forming the tube as illustrated in step 61, then drilling or otherwise forming openings in step 62, pressing in the enhanced property ceramic materials and, using the mandrel and rubber mold (isostatically or otherwise), forming the added materials having enhanced properties to densify and retain the enhanced property material in place in step 63.

Optimally the tube can be sized by lathe or grinding operation, as represented at 64, and then sintering as represented at 65 is carried out. The cooled tube is then formed to its finished size as represented at 66. The electric leads and the excitation devices are then placed on the tube for use.

The monolithic construction provides a flow tube with fluid contacts and magnetic pole pieces without cracks, flaws or serious imperfections. The tube can be used without an outer metal support tube or cover tube in that the sintered, all ceramic tube, will have sufficient strength for operation.

Figure 7:
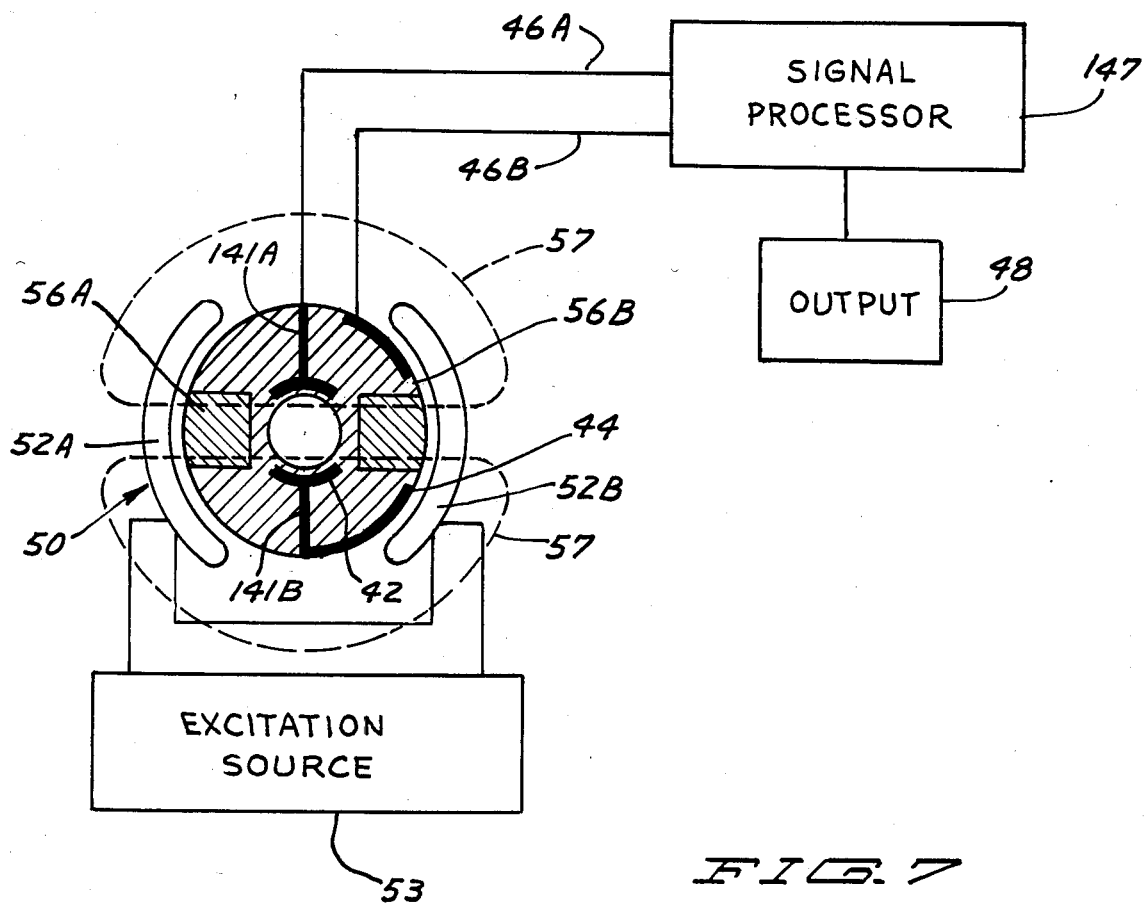
FIG. 7 is a part schematic, part sectional view of an alternate flowmeter with a non-conductive layer between enhanced electrically conductive regions and a bore of the flow tube.

In FIG. 7 a further modified form of the invention is shown. The flowmeter of FIG. 7 is similar to that shown in FIG. 5 with corresponding numbers identifying similar parts. In FIG. 7, enhanced electrically conductive regions 141A and 141B do not extend to a bore 42 of the flow tube. Regions 141A and 141B are substantially insulated from the bore by a portion of the non-conductive material making up the unenhanced regions of the flow tube. The flow induced signal is capacitively coupled through non-conductive material to the enhanced conductive regions. The conductive regions transfer the flow induced signal to circuit leads 46A and 46B which in turn carry the signal to signal processor 147. Signal processor 147 may present high impedances to and accept a voltage signal representative of flow from circuit leads 46A and 46B. Signal processor 147 may alternatively present low impedance inputs to and accept a current signal representative of flow from circuit leads 46A and 46B.

Although the present invention has been described with reference to preferred embodiments, workers skilled in the art will recognize that changes may be made in form and detail without departing from the spirit and scope of the invention.

What is claimed is:

1. A magnetic flowmeter comprising a flow tube formed of a low permeability, non-conductive ceramic material; the flowmeter having means externally disposed on the flow tube for producing a magnetic field in an electrically conductive pressurized fluid flowing through a bore in the flow tube and having circuit means external to the flow tube for receiving a signal representative of flow; the flow tube having a wall surrounding the bore, the flow tube further comprising:
   a plurality of regions having enhanced electrical conductivity formed in the ceramic material of the flow tube and having each region disposed in the wall between the bore of the flow tube and the circuit means for transferring the signal representative of flow from the electrically conductive fluid to the circuit means, the regions comprising ceramic mixtures of ceramic and metal powders sintered into the flow tube, the ceramic powder in the regions being constituted as substantially the same ceramic material as the flow tube to provide sufficient strength such that the wall contains the pressure and is substantially free from external support for containing the pressure.

2. A magnetic flowmeter as recited in claim 1 wherein the flow tube is formed as a sintered monolithic structure.

3. A magnetic flowmeter as recited in claim 2 wherein the regions having enhanced electrical conductivity are two regions spaced on opposite sides of the bore in the flow tube for receiving the signal representative of flow.

4. A magnetic flowmeter as recited in claim 3 wherein the regions having enhanced electrical conductivity are integrated into the material of the flow tube.

5. A magnetic flowmeter as recited in claim 3 wherein the signal representative of flow transferred to the circuit external to the flow tube is a current.

6. A magnetic flowmeter as recited in claim 5 wherein the regions having enhanced electrical conductivity are substantially insulated from the electrically conductive fluid by a portion of the non-conductive material forming the flow tube.

7. A magnetic flowmeter as recited in claim 1 further comprising:
   a first region having an enhanced magnetic permeability formed in the material of the flow tube and disposed between the means for producing and the bore of the flow tube for transferring the magnetic field to the electrically conductive fluid flowing through the bore in the flow tube.

8. A magnetic flowmeter as recited in claim 7 further comprising:
   a second region having an enhanced magnetic permeability formed in the material of the flow tube, disposed between the means for producing and the bore of the flow tube; and
   the first and second regions having enhanced magnetic permeability being space on opposite sides of the bore of the flow tube.

9. A magnetic flowmeter as recited in claim 8 wherein the flow tube is formed as a sintered monolithic structure.

10. A magnetic flowmeter as recited in claim 9 wherein the magnetic field is produced substantially perpendicular to a direction of fluid flow in the bore of the flow tube.

11. A magnetic flowmeter as recited in claim 10 wherein the first and second regions having enhanced magnetic permeability are integrated into the material of the flow tube.

12. A magnetic flowmeter as recited in claim 10 wherein the signal representative of flow is a current.

13. A magnetic flowmeter as recited in claim 12 wherein the regions having an enhanced electrical conductivity are substantially insulated from the electrically conductive fluid by a portion of the non-conductive material forming the flow tube.

14. The flow tube of claim 1 wherein the material comprising the flow tube further comprises fibers interspersed in the flow tube wall for reinforcing the flow tube.

15. A flow tube formed of a low permeability, non-conductive ceramic material for a magnetic flowmeter; the flowmeter having means externally disposed on the flow tube for producing a magnetic field in an electrically conductive fluid flowing through a bore in the flow tube and having circuit means external to the flow tube for receiving a signal representative of flow; the flow tube comprising:
   a first region formed of a ceramic material having enhanced magnetic permeability sintered in the ceramic material of the flow tube and disposed between the means for producing and the bore of the flow tube for transferring the magnetic field from the means for producing to the electrically conductive fluid flowing in the bore in the flow tube, and a second region formed of a ceramic material having enhanced electrical conductivity sintered in the ceramic material of the flow tube and disposed between the circuit means and the bore of the flow tube for transferring the signal representative of flow from the fluid to the circuit means and having mechanical strength such that the flow tube is pressure bearing.

16. A flow tube as recited in claim 15 wherein the flow tube is formed as a sintered monolithic structure.

17. A flow tube as recited in claim 15 further comprising a third region having enhanced magnetic permeability formed in the material of the flow tube for transferring the magnetic field from the means for producing to the fluid flowing in the bore in the flow tube; the first and third regions having enhanced permeability being spaced on opposite sides of the bore of the flow tube.

18. A flow tube as recited in claim 17 wherein the flow tube is formed as a sintered monlithic structure.

19. A flow tube as recited in claim 18 wherein the first and second regions having enhanced magnetic permeability are integrated into the material of the flow tube.

20. A flow tube as recited in claim 18 wherein the signal representative of the flow is a current.

21. A flow tube as recited in claim 20 wherein the signal representative of flow is capacitively coupled from the fluid in the bore of the flow tube through the non-conductive material forming the flow tube to the circuit for receiving the signal representative of flow.

22. An electromagnetic flowmeter for measuring a flow of a conductive fluid comprising:
means for producing a magnetic field inducing a signal representative of flow in the conductive fluid;
means for converting the signal representative of flow to an output signal;
a flow tube having a cylindrical wall formed of a ceramic low permeability, non-conductive material for carrying the flow;
a pair of ceramic electrode regions coupled to the converting means and formed of sintered powders disposed in the flow tube wall for sensing the induced signal;
a pair of magnetic pole regions formed of a magnetic ceramic material and disposed in the flow tube wall for transferring the magnetic field from the means for producing to the conductive fluid; and
wherein the pair of ceramic electrode regions and the pair of ceramic magnetic pole regions are sintered in such that the cylindrical wall is pressure bearing.

23. A flowmeter recited in claim 22 wherein the flow tube is formed as a sintered monolithic structure.

24. The flowmeter of claim 22 wherein the material forming the wall of the flow tube comprises alumina.

25. The flowmeter of claim 22 wherein the magnetic ceramic material comprises ferrite.

26. The flowmeter of claim 22 wherein the ceramic electrode regions material comprise a mixture of alumina and platinum.

27. The flow tube of claim 26 wherein the mixture of alumina and platinum is gradually varied in the material formed from the regions such that stress concentration is reduced in the flow tube.

28. The flow tube of claim 22 including reinforcing fibers interspersed in the material forming the wall of the flow tube to reinforce the material for improved strength.

29. A magnetic flowmeter comprising a flow tube formed of a low permeability, non-conductive ceramic material; the flowmeter having means externally disposed on the flow tube for producing a magnetic field in an electrically conductive pressurized fluid flowing through a bore in the flow tube and having circuit means external to the flow tube for receiving a signal representative of flow; the flow tube having a wall surrounding the bore, the flow tube further comprising:
a plurality of regions having enhanced electrical conductivity formed in the ceramic material of the flow tube and having each region disposed in the wall between the bore of the flow tube and the circuit means for transferring the signal representative of flow from the electrically conductive fluid to the circuit means, the regions comprising ceramic mixtures of ceramic and metal powders sintered into the flow tube to provide sufficient strength such that the wall contains the pressure and is substantially free from external support for containing the pressure, the mixture of ceramic and metal powders in the regions being gradually varied in the regions such that stress concentration is reduced.

* * * * *

UNITED STATES PATENT AND TRADEMARK OFFICE
CERTIFICATE OF CORRECTION

PATENT NO. : 4,741,215

DATED : May 3, 1988

INVENTOR(S) : David C. Bohn et al.

It is certified that error appears in the above-identified patent and that said Letters Patent is hereby corrected as shown below:

Column 3, line 35, delete "mndrel" and insert --mandrel--;
line 37, delete "removal" and insert --removed--.
Column 4, line 10, delete "large" and insert --larger--.
Column 5, line 17, after "enhanced", delete "." (period).
Column 9, line 19, delete "monlithic" and insert --monolithic--.

Signed and Sealed this

First Day of November, 1988

Attest:

DONALD J. QUIGG

*Attesting Officer*     Commissioner of Patents and Trademarks